United States Patent [19]
Smith et al.

[11] Patent Number: 6,073,029
[45] Date of Patent: *Jun. 6, 2000

[54] METHOD AND SYSTEM FOR PROVIDING WIRELESS COMMUNICATIONS TO A SUBSCRIBER OF A PRIVATE WIRELINE NETWORK

[75] Inventors: Dennis C. Smith, Longmont; Michael J. Fargano, Louisville, both of Colo.

[73] Assignee: U S West, Inc., Denver, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/900,250

[22] Filed: Jul. 25, 1997

[51] Int. Cl.[7] ........................................ H04Q 7/20
[52] U.S. Cl. ........................ 455/555; 455/461; 455/560
[58] Field of Search .................... 455/422, 426, 455/432, 433, 436, 445, 461, 462, 463, 552, 554, 555, 444, 560, 561; 370/336, 466, 522, 524

[56] References Cited

U.S. PATENT DOCUMENTS

| | | | |
|---|---|---|---|
| 4,748,655 | 5/1988 | Thrower et al. | 455/555 |
| 5,353,331 | 10/1994 | Emery et al. | 455/555 |
| 5,469,496 | 11/1995 | Emery et al. | 379/58 |
| 5,506,887 | 4/1996 | Emery et al. | 379/58 |
| 5,537,610 | 7/1996 | Mauger et al. | 455/433 |
| 5,627,881 | 5/1997 | Fletcher | 455/444 |

OTHER PUBLICATIONS

Harry Newton, "Newton's Telecom Dictionary" pp. 768–770, Nov. 1994.

*Primary Examiner*—Dwayne D. Bost
*Assistant Examiner*—Nay Maung
*Attorney, Agent, or Firm*—Brooks & Kushman

[57] ABSTRACT

A method and system for providing wireless communications to a subscriber of a private wireline network includes a private wireline switch and a wireline interface. The switch processes and controls telephone calls to and from the subscriber to provide a plurality of communication features to the subscriber. The wireline interface is in communication with the switch and the public wireless network for providing wireless communications to the subscriber via the switch.

18 Claims, 7 Drawing Sheets

METHOD AND SYSTEM FOR PROVIDING WIRELESS COMMUNICATIONS TO A SUBSCRIBER OF A PRIVATE WIRELINE NETWORK

TECHNICAL FIELD

This invention relates to a method and system for providing wireless communications to a subscriber of a private wireline network regardless of which network the subscriber is in.

BACKGROUND ART

A Private Business Exchange (PBX) is a private switching element that provides its business users with features and access to the public network. Calls that are made to a PBX station from the Public Switched Telephone Network (PSTN) are routed to a Class 5 switch serving that PBX. The Class 5 switch routes the calls over PBX trunks to the PBX for termination to the stations served by the PBX. When a PBX user originates a call to the PSTN, the user typically dials an access digit, i.e., "9", plus the called party's telephone number. The call is then forwarded to the serving Class 5 switch in the PSTN for termination to the called party. The calls among stations served by the PBX are processed internally to the PBX. The PBX is also responsible for providing features, such as abbreviated dialing, call forwarding, call transfer, etc., to the PBX stations. A Centrex arrangement provides similar functions except the stations in the business environment are served directly from the Class 5 switch which includes specific software to provide business features similar to those features provided by the PBX. In this arrangement, a switch may not be located on the business customer's premises.

In both the PBX and the Centrex environments, equipment is available to the business customer which allows them to provide wireless access to their users. A known prior art system is illustrated in FIG. 1. A Class 5 switch 10, such as a Service Switching Point (SSP), serves a PBX 12 via a plurality of PBX trunks 14. The PBX 12 allows users to use a desktop telephone 16 as well as a wireless handset 18. Wireless service is provided to the wireless handset 18 via an adjunct 20 that provides radio port control functionality to manage micro cells (radio base stations) 22 that are located strategically in the business environment to provide in-building coverage for the PBX users. This adjunct 20 enables the users to have mobility within a specific radio coverage environment, such as a building or a campus. However, if the user moves too far from the business environment, they may move outside the coverage area of the micro cells 22 and not be able to use their wireless handset 18.

A public wireless radio network, or Personal Communication Service (PCS), typically includes a PCS switch 24 in communication with a Base Station Controller (BSC) 26. BSC 26 controls a plurality of Base Stations (BSS) 28 which provide cellular service to various wireless handsets 30 (only one is shown). Currently, however, there is no mechanism for allowing the user of the wireless handset 18 in the PBX system to roam into the PCS system and take advantage of the wireless coverage provided by BSC 26 while still allowing the PBX/Centrex system to maintain control of the user's features and call processing.

A lack of interworking capability between wireless business systems and public wireless networks introduces several drawbacks. The primary drawbacks include no hand-off of a call between the public and private networks and the inability for a wireless PBX user to be able to receive a call while roaming in a public wireless network.

An integrated PCS network is disclosed in U.S. Pat. No. 5,506,887 issued to Emery et al. Emery discloses a system structure for interfacing the capabilities of a land line telephone system with a radio link communications system and controls the provision of private network service features to users of both radio link systems and land line systems. Call processing data associated with each subscriber is stored in a central service control point, or database, within the network. Call routing can then be provided to either a land line or a wireless unit via a mobility controller in communication with the database in response to calls directed to the user's single telephone number. Thus, the system disclosed by Emery provides all the services unique to both the land line telephone system and the radio system to the user via one single telephone number and a central database. Emery, however, fails to disclose a system architecture that integrates an existing PBX wireless network and an existing PCS network so that a subscriber of the PBX wireless network can roam into the public PCS network without any action being taken by the subscriber.

Thus, there exists a need to provide a flexible network architecture that integrates the features and services provided by a private business network with the unlimited roaming capability associated with the public wireless network.

DISCLOSURE OF THE INVENTION

It is thus a general object of the present invention to provide a method and system enabling a user of a private network to obtain access to the public wireless network while maintaining all the features associated with the private wireline network.

In carrying out the above objects and other objects, features and advantages of the present invention, a method is provided for providing wireless communications to a subscriber of a private wireline network in which the private wireline network includes a switch for processing and controlling telephone calls to and from the subscriber in order to provide a plurality of communication features to the subscriber, and a wireline interface is provided in communication with the switch and the public wireless network. The method includes the step of enabling the public wireless network to provide wireless communications to the subscriber via the switch.

In further carrying out the above object and other objects, features and advantages of the present invention, a system is also provided for carrying out the steps of the above-described method. The system includes a switch in the private wireline network for processing and controlling telephone calls to and from the subscriber to provide a plurality of communications and features to the subscriber. The system also includes a wireline interface in communication with the switch and the public wireless network for enabling the public wireless network to provide wireless communications to the subscriber via the switch.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
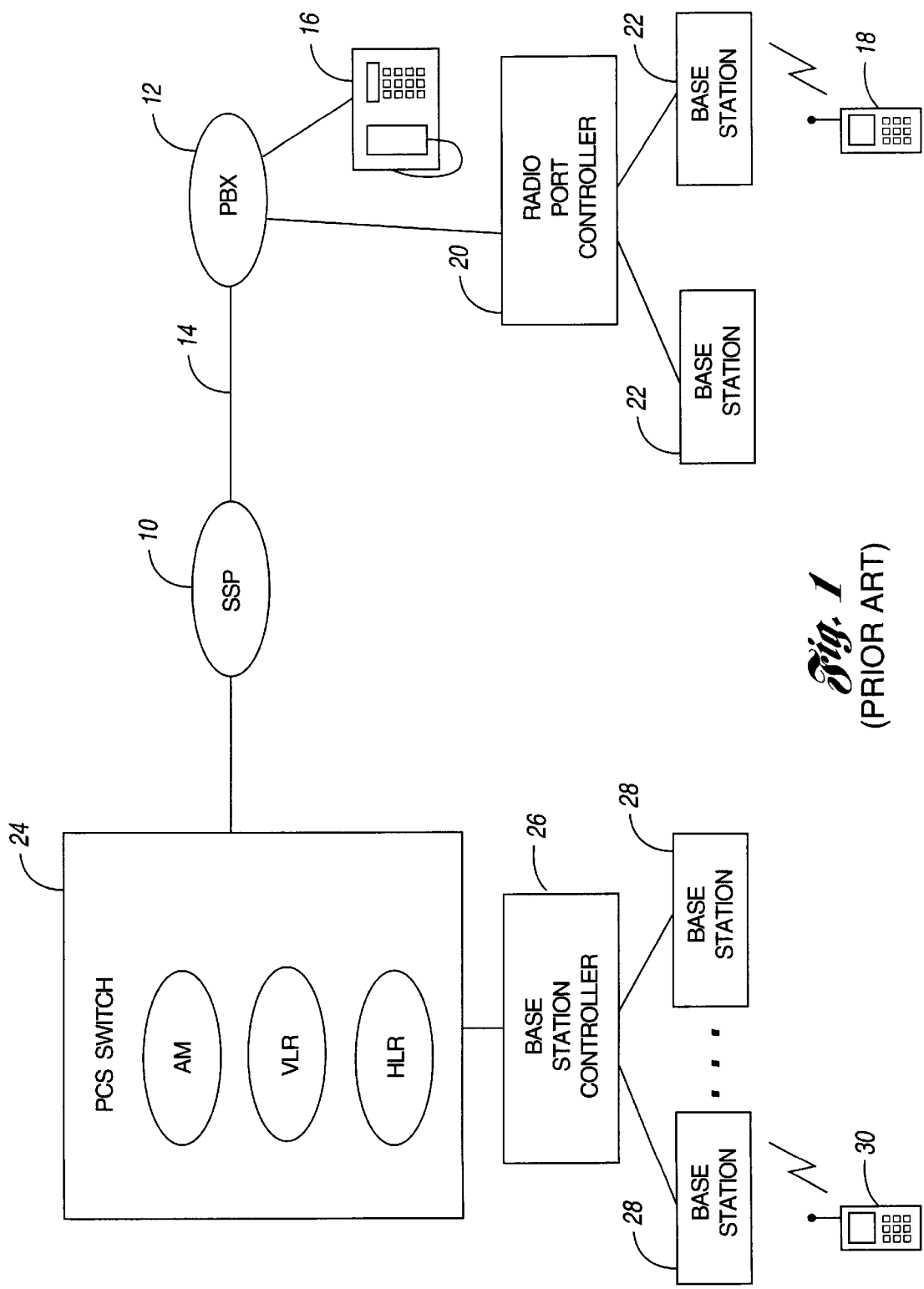
FIG. 1 is a schematic diagram of a prior art PBX system supporting wireless communications.
Figure 2:
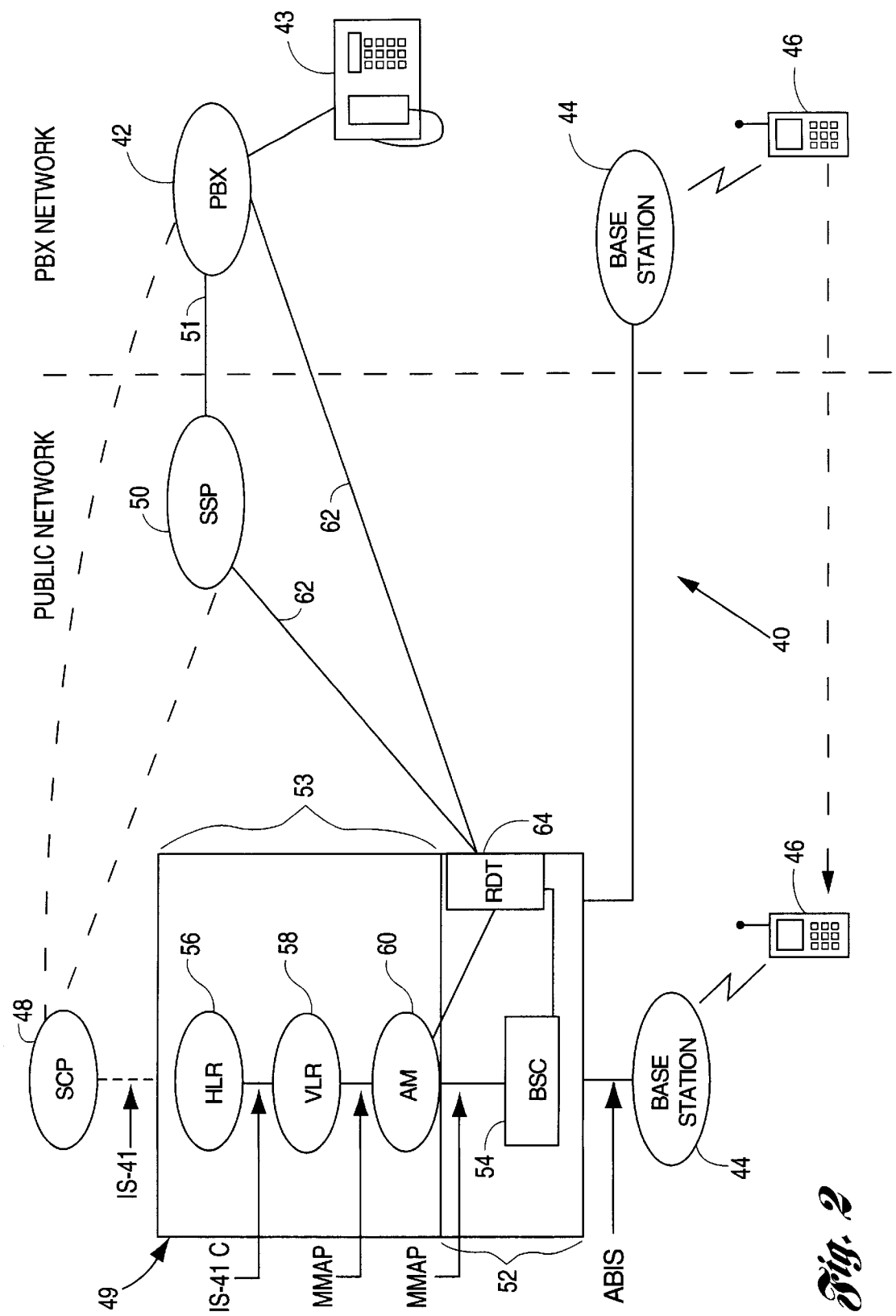
FIG. 2 is a schematic diagram of the system architecture of the present invention.

A schematic diagram of the system of the present invention is shown in FIG. 2. The system, denoted generally by reference numeral 40, includes a private wireline network, such as a PBX network, and a public network. The PBX network includes a PBX switch 42 and at least one Private Base Station (BS) 44. Private BS 44 is controlled by the public wireless network, as will be described in greater detail below. PBX switch 42 is responsible for providing features associated with subscriber lines to its users, including, but not limited to, abbreviated dialing, call waiting, three-way calling, call forwarding and call transfer. PBX switch 42 enables a user to receive or originate calls from either a desktop station 43 or from a wireless handset 46 via BS 44 while the user is within the PBX network.

The Public Network includes a wireline portion and a wireless portion. The wireline portion is a telecommunications network consisting of a number of switches and application processors interconnected by transmission circuits. Common Channel Signaling, such as Signaling System No. 7 (SS7), is a signaling method in which a signaling channel conveys, by means of labeled messages, signaling information relating to call setup, control, network management, and network maintenance The SS7 network exists within the telecommunications network and controls it. SS7 achieves this control by creating and transferring call processing, network management and maintenance messages to the network's various components.

An SS7 network has three distinct components, Service Switching Points (SSPs) 50, Signal Transfer Points (STPs) (not shown), and Service Control Points (SCPs) 48. SCP 48 contains centralized network databases for providing enhanced services. SCP 48 accepts queries from SSP 50 and returns the requested information to the originator of the query. SSP 50 is a telephone switch, or Class 5 switch, which performs call processing on calls that originate, tandem, or terminate at that site. SSP 50 is known as a digital telephone exchange which controls the switching between the wireline network and mobile cell sites from all wireline-to-mobile, mobile-to-wireline, and mobile-to-mobile calls. SSP 50 also serves the PBX network by transferring calls directed to the PBX switch 42 via PBX trunks 51.

The wireless portion of the Public Network, or PCS, includes a processor 49 for translating between wireline and wireless communications protocols of the wireline network and the public wireless network, respectively. Processor 49 preferably includes an Access Controller (AC) 52 and an Access Management System (AMS) 53. AC 52 preferably consists of a BSC 54 which serves each coverage area of the public wireless network via a plurality of Base Stations (BSs) 44 (only one of which is shown) disposed throughout each of the adjoining cells (not shown). BSC 54 manages each of the radio channels assigned to its coverage area, supervises calls, turns the radio transceivers on and off, injects data onto control and user channels, and performs diagnostic tests on the call site equipment.

AMS 53 retrieves all necessary data to respond to subscriber call requests from three databases—a Home Location Register (HLR) 56, a Visitor Location Register (VLR) 58, and an Access Manager (AM) 60—each discussed more fully herein.

HLR 56 is a master database for storing data related to each mobile subscriber, such as the subscriber profile and mobility information together with their permanent (static) data, such as access capabilities and subscriber services. In addition, HLR 56 is in electrical communication with and provides VLR 58 with information about the service area where the wireless handset 46 is actually located (temporary or dynamic data) to allow incoming calls to be delivered immediately to the called subscriber's wireless handset 46.

VLR 58 is a temporary database containing detailed data on location and service data regarding each subscriber entering its coverage area for routing which is used for incoming and outgoing calls. VLR 58 is in electrical communication with AM 60 and HLR 56 so that AMS 53 may set up incoming and outgoing calls. VLR 58 is a dynamic subscriber database, exchanging considerable amounts of data with its related HLR 56.

AM 60 manages the mobility functionality of the wireless network of the system 40. AM 60 accesses HLR 56 when a subscriber registers in the network in order to authenticate the user. Together with BSC 54, AM 60 provides radio functionality such as registration, authentication, and call hand off between base stations 44.

HLR 56, VLR 58 and AM 60 are typically connected with each other by IS-41 Mobile Application Part (MAP) protocols operating over SS7 or X.25 networks. IS-41 data trunks are packet switched networks having either X.25 or SS7 type transport options.

Integrated Public/Private System

The public wireless network is physically integrated with the PBX Network via a wireline interface 62 having line side features connected between PBX switch 42 and processor 49. Wireline interface 62 is a transport mechanism that supports a communication protocol having a separate voice path and signaling information path for simultaneously transmitting both voice and signaling information. Wireline interface 62 is generic and may be supported by any number of available technologies, such as Basic Rate Integrated Services Digital Network (ISDN), Integrated Digital Loop Carrier (IDLC) system GR-303, IDLC TR-008, or a plurality of copper wire pairs. In the preferred embodiment, wireline interface 62 is an IDLC GR-303 interface which provides multiplexing on each end of the interface 62 to dynamically assign time slots to each call.

When using a GR-303 interface 62, a Remote Digital Terminal (RDT) 64 is preferably disposed in AC 52 of processor 49 and in communication with wireline interface 62. RTDT 64 provides the interface functionality between SSP 50 and PBX switch 42 and AC 52 in order to provide wireless access to SSP 50 and PBX switch 42 for the wireless users.

An RDT, such as an SLC-96, manufactured by Lucent Technologies, may be used in the present invention. It should be noted that the implementation of RDT in AC 52 is vendor specific. How RDT 64 is implemented is up to each vendor as long as the interface appears to the SSP/PBX as a typical GR-303 system.

In order to identify a subscriber of the private wireline network in the public wireless network, it is necessary to map the subscriber's directory number (DN) (or office wireline telephone number) to the Mobile Identification Number (MIN) and Electronic Serial Number (ESN) associated with his/her wireless handset 46. This mapping of DNs to MINs is preferably contained in HLR 56. HLR 56 also contains data indicating whether or not the subscriber is a private wireline network user so a call can be connected to the appropriate PBX switch 42 or SSP 50.

Figure 3:
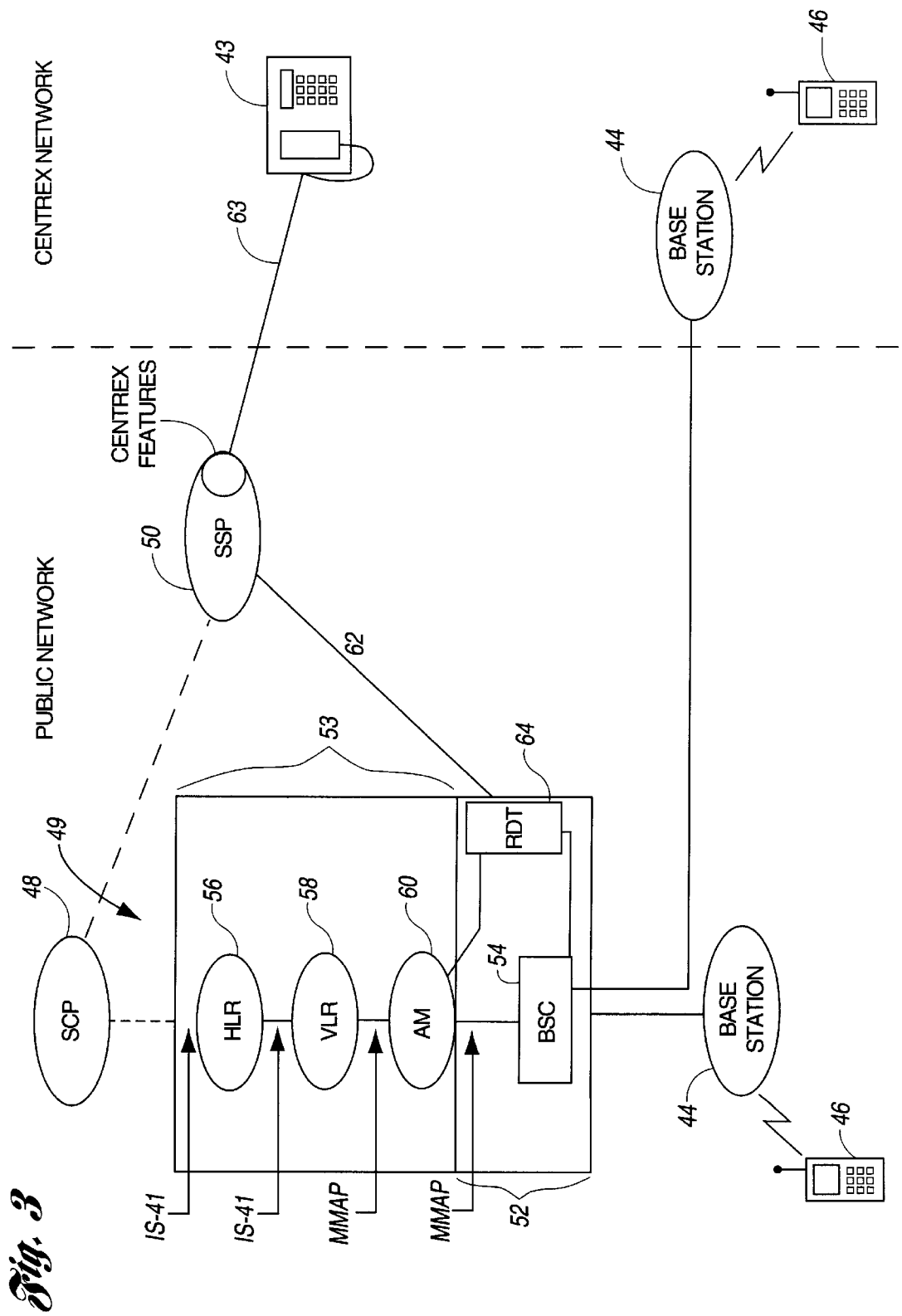
FIG. 3 is a schematic diagram of a second embodiment of the system of the present invention.

An alternative embodiment of the system of the present invention is illustrated in FIG. 3 for a Centrex network. The same basic principals apply to the Centrex network as they do to the PBX network. The primary difference is that the Centrex network is always served directly by the Class 5 SSP switch 50 for call processing and features rather than a PBX. This arrangement is similar to the PBX option in that the BS 44 positioned in or near the business environment is managed as just another radio element in the PCS network.

All calls to the Centrex users are controlled by SSP 50. It is similar to the PBX arrangement in that the radio elements are shared across the two networks. When a call is placed to a Centrex user, SSP 50 either routes the call to desktop station 43 via line 63 having Centrex features or to processor 49 of the public wireless network via wireline interface 62. Should a Centrex user originate a call from their wireless handset 46, AM 60 would recognize them as a user with specific features and route the call to SSP 50 via wireline interface 62 to be treated the same as if they were using their desktop station to originate a call. As with the PBX arrangement, features can be specified that would have either station ring when a call is being delivered to the user so that calls can be answered regardless of which environment they are in. The Centrex user could also "roam" onto the public network and originate or receive calls no matter which BS 44 they were being served by at any particular time.

The radio equipment at the Centrex environment interconnects with the public network by the Abis interface, as shown in FIG. 3. The wireline interface 62 utilized between SSP 50 and AC 52 is used for both public users and the Centrex users. As with the PBX arrangement, this would minimize the wireless management equipment that would be required at the business location as the business would not be required to purchase off-the-shelf adjunct equipment to provide wireless access to the business user but rather utilize the same equipment as being utilized by the public network.

Operation

With reference now to FIGS. 4–7 of the drawings, the operation of the present invention in the PBX network will be described in greater detail. Similar call functionality also applies to the Centrex network.

Figure 4:
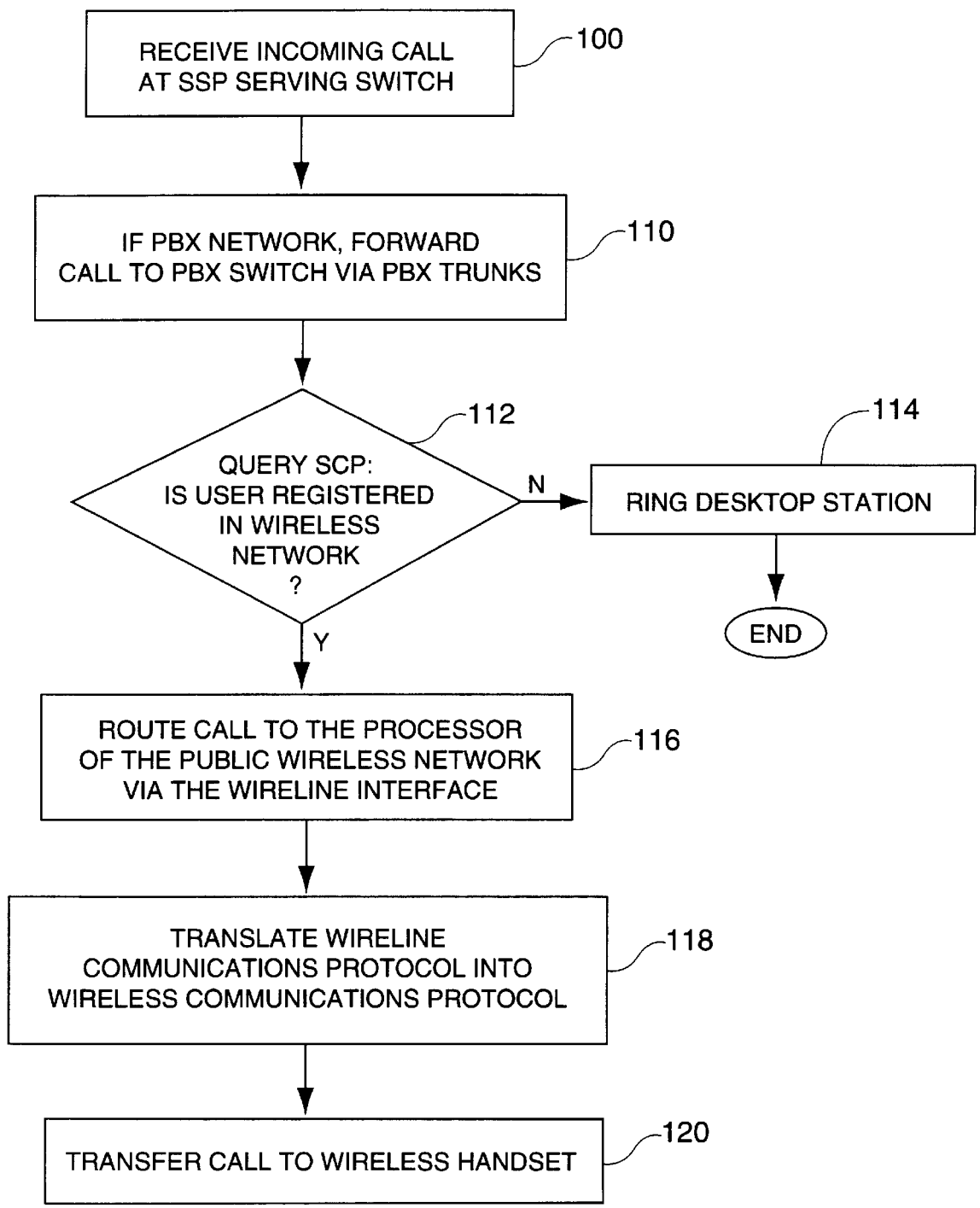
FIG. 4 is a flow diagram illustrating the general sequence of steps associated with receiving an incoming call utilizing the system of the present invention.
Figure 5:
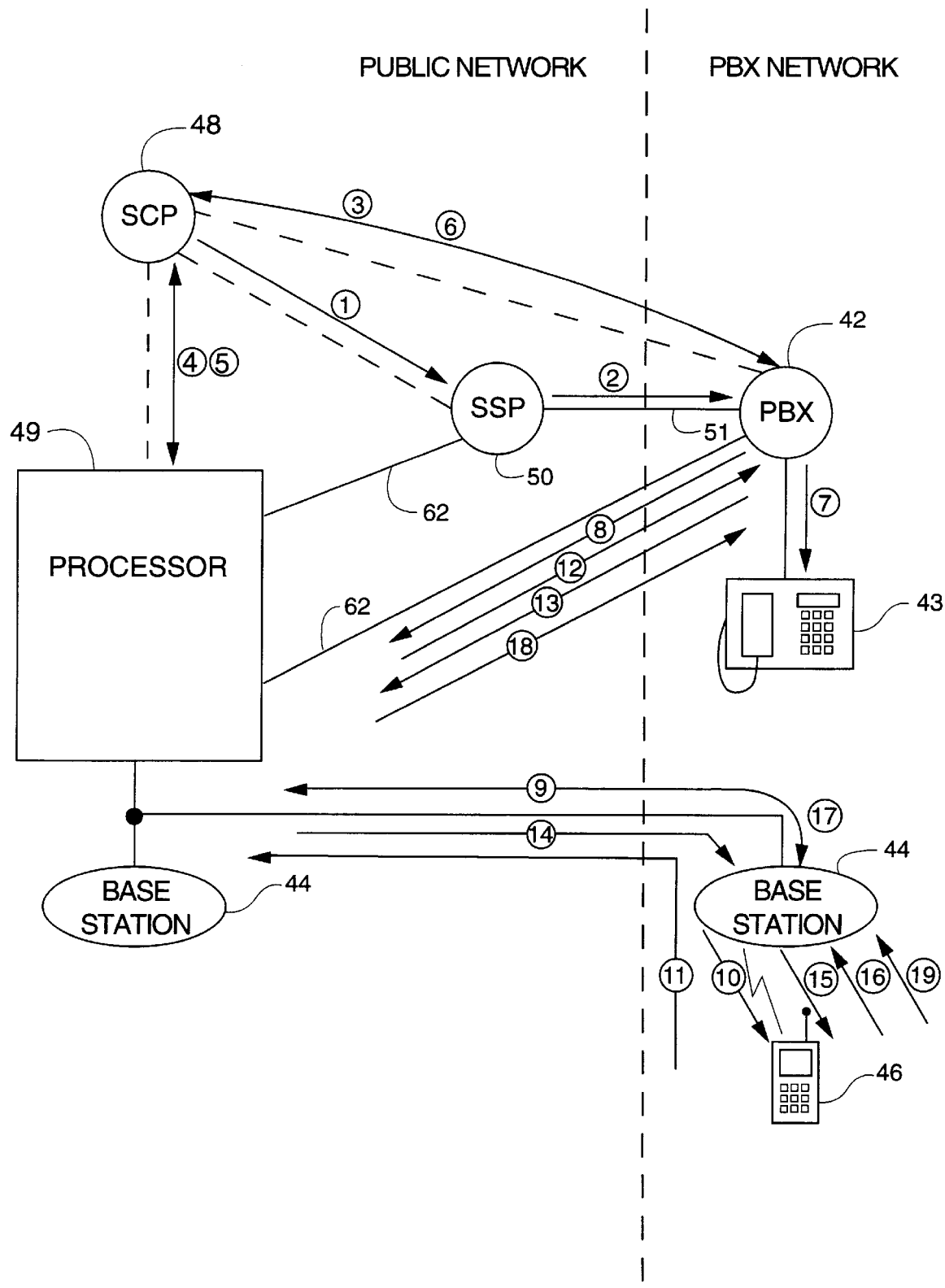
FIG. 5 is a call flow diagram associated with FIG. 4.

FIGS. 4 and 5 illustrate the sequence of steps associated with receiving an incoming call directed to a PBX user.

1 & 2. An incoming call is first received at the serving SSP switch 50, which then forwards the incoming call to PBX switch 42, as shown at blocks 100 and 110. In the Centrex network, the call is not forwarded to a PBX switch.

3. SCP 48 is then queried to determine if the user/ subscriber is registered in the wireless network, as shown at conditional block 112.

4 & 5. This is accomplished by comparing the DN of the called party with the MINs in the HLR 56 of processor 49, as described above.

6. SCP 48 informs PBX switch 42 whether or not the user is registered in the public wireless network.

7. If the subscriber is not registered in the wireless network, i.e., wireless handset set 46 is not powered on, PBX switch 42 rings desktop station 43, as shown at block 114, according to typical PBX operation.

8. If the subscriber is registered, PBX switch 42 routes the call to the processor 49 of the public wireless network via wireline interface 62, as shown at block 116. Alternatively, PBX switch 42 may be programmed to automatically ring either both or one of the stations (desktop station 43 or wireless handset 46) upon receiving an incoming call. Furthermore, the system may be configured so that predetermined Advanced Intelligent Network (AIN) triggers cause SCP 48 to determine the location of the user before directing the call to the wireless network by automatically determining whether or not the wireless handset is powered on.

9. At block 118, the processor 49 translates the wireline communications protocol of the private wireline network into a wireless communications protocol consistent with the public wireless network and signals the wireless BS 44 serving the wireless handset 46.

10. The call is then transferred to the wireless handset 46, as shown at block 120. Thus, PBX switch 42 maintains control of the call.

11. At this point, if any other activity takes place, such as the user attempting to make a second call via three-way calling, processor 49 accepts signalling data, such as a "flash" signal, from wireless handset 46 via BS 44.

12. Processor 49 translates the signalling information and forwards the "flash" signal to PBX switch 42 via wireline interface 62.

13, 14 & 15. PBX switch 42 recognizes the signal as a flash hook, places the first call on hold and sends a dial tone to wireless handset 46 via wireline interface 62, processor 49 and BS 44.

16, 17 & 18. The user inputs the digits for the third party which are forwarded to PBX switch 42 via BS 44, processor 49 and wireline interface 62.

19. When the third party answers the call, the wireless handset 46 sends a second flash signal which is forwarded to PBX switch 42 via wireline interface 62.

While in the private wireline network, the user may originate a call from either their desktop station 43 or their wireless handset 46. If the outgoing call is from the desktop station 43, the call proceeds as a normal PBX call either to another PBX station or to the public wireline network.

Figure 6:
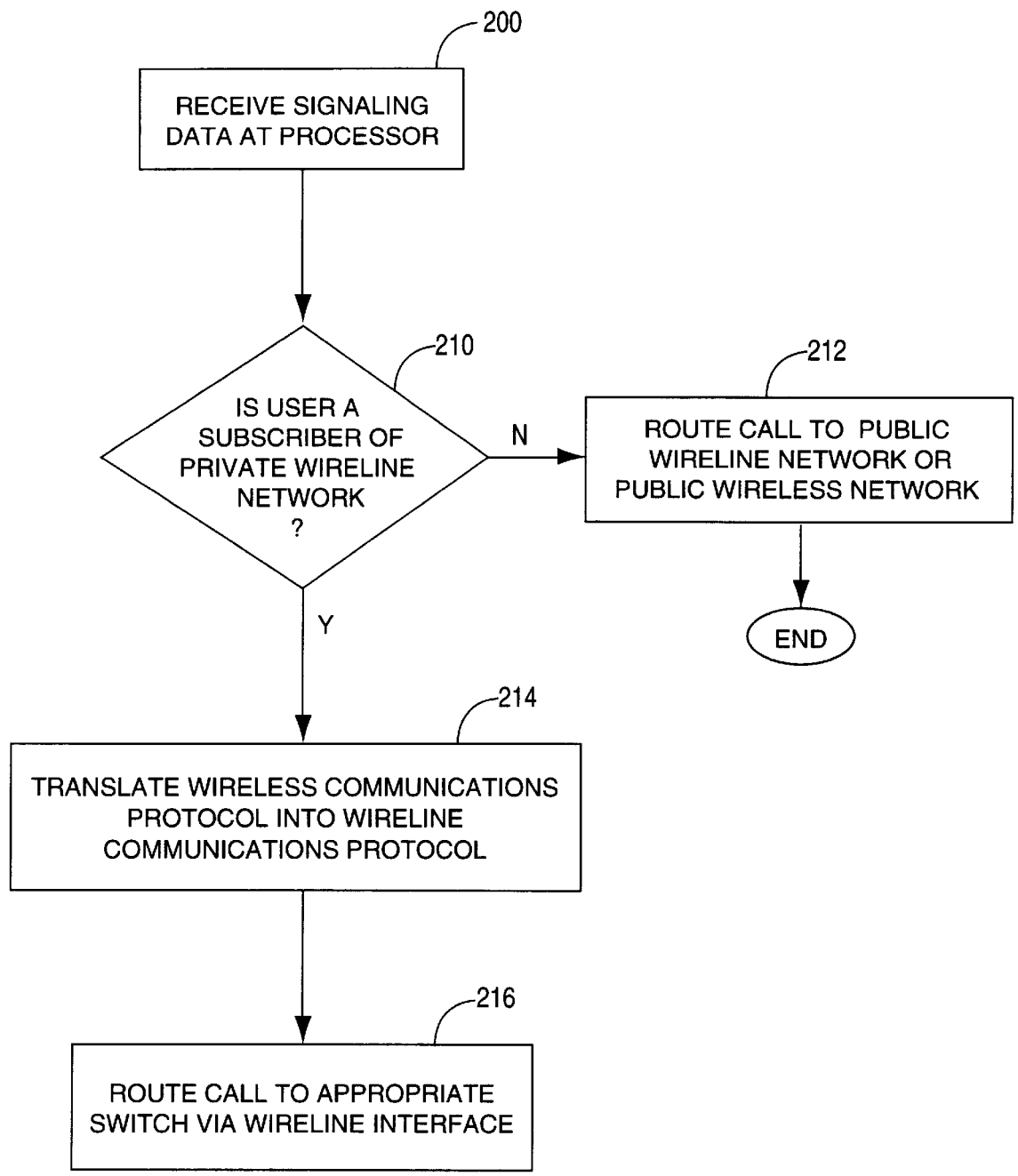
FIG. 6 is a flow diagram illustrating the general sequence of steps associated with placing an outgoing call utilizing the system of the present invention.
Figure 7:
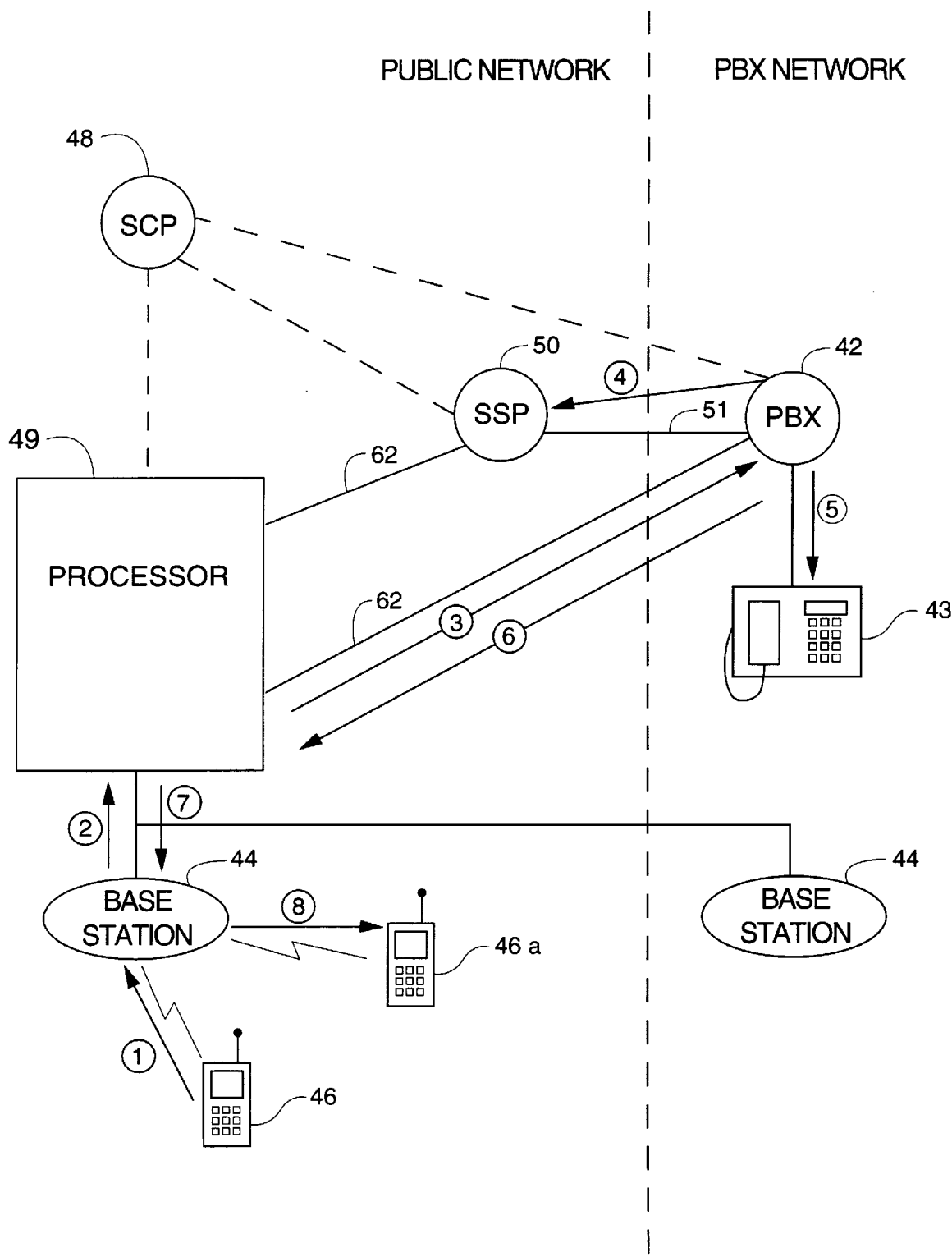
FIG. 7 is a call flow diagram associated with FIG. 6.

FIGS. 6 and 7 illustrate the sequence of steps performed when an outgoing call of a private wireline network subscriber is initiated.

1 & 2. The signalling data from wireless handset 46 is received at processor 49 via BS 44, as shown at block 200. A determination is then made as to whether or not the user is a subscriber of a private wireline network, as shown at conditional block 210. If not, the call is routed to the public wireline network or the public wireless network according to typical operations, as shown at block 212.

3. If the user is a subscriber of a private wireline network, the wireless communications protocol is translated into wireline communications protocol, as shown at block 214. Based on the data stored in HLR 56, the call is then routed to the PBX switch via wireline interface 62, as shown at block 216.

4. If the call is directed to the public network, PBX switch 42 transfers the call to SSP 50 via PBX trunks 51.

5. If the call is directed to the desktop station 43 in the private wireline network, PBX switch 42 transfers the call to desktop station 43.

6. If the call is directed to a PBX user in the wireless network, PBX switch 42 transfers the call to processor 49 via wireline interface 62.

7 & 8. Processor 49 translates the call and forwards the call to a second wireless handset 46a via BS 44. If during the course of the call either wireless handset 46 or 46a moves from one BS 44 to another BS 44, the call is handed off appropriately by the public wireless network just like any other wireless user.

Call processing, feature control (such as, call forwarding, call waiting, etc.), billing, etc., is maintained at PBX switch 42 so that the subscriber maintains his/her features in both the private wireline network and the public wireless network. Mobility management, on the other hand, such as subscriber registration, authentication, hand-off, roaming, paging, etc., is provided by the wireless portion of the system.

The system architecture of the present invention allows the subscriber to have a service which combines his/her wireline and wireless service. Thus, the processor 49 of the present invention allows a wireless handset to roam throughout the domain of the public wireless network by serving both the private BS 44 and the public BS 44. The system of the present invention also allows the subscriber to have the same features/services in both the private network and the public wireless network.

While the best modes for carrying out the invention have been described in detail, those familiar with the art to which this invention relates will recognize various alternative designs and embodiments for practicing the invention as defined by the following claims.

What is claimed is:

1. In a telecommunications system having a switch in a private wireline network for processing and controlling telephone calls to and from a subscriber to provide a plurality of communications features to the subscriber, a method for providing wireless communications to the subscriber of the private wireline network utilizing a public wireless network, the method comprising:

providing a processor in the public wireless network and in communication with the switch for translating between wireline and wireless communications protocols;

providing a base station in the private wireline network and in communication with the processor for providing wireless communications to the subscriber; and providing a wireline interface coupled between the switch and the processor for enabling the processor to control wireless communications to the subscriber via the base station when the subscriber is located in the private wireline network.

2. The method as recited in claim 1 wherein providing the wireline interface further includes providing the wireline interface for supporting the plurality of communications features provided by the private wireline network to the subscriber.

3. The method as recited in claim 2 wherein supporting the plurality of communications features includes simultaneously transmitting voice and signaling information between the private wireline network and the public wireless network.

4. The method as recited in claim 1 wherein the private wireline network communicates via a wireline communication protocol and the public wireless network communicates via a wireless communication protocol and wherein the method further comprising translating between the wireline and wireless communication protocols.

5. The method as recited in claim 1 further comprising determining whether or not a user of the public wireless network is a subscriber of the private wireline network.

6. The method as recited in claim 5 wherein the public wireless network includes a database containing identification data for all users of the public wireless network, and wherein determining includes comparing identification data of the user with the identification data in the database.

7. The method as recited in claim 1 wherein enabling includes enabling the subscriber to roam throughout the public wireless network.

8. A system for providing wireless communications to a subscriber of a private wireline network utilizing a public wireless network, the system comprising:

a switch in the private wireline network for processing and controlling telephone calls to and from the subscriber to provide a plurality of communications features to the subscriber;

a processor in the public wireless network and in communication with the switch for translating between wireline and wireless communications protocols;

a base station in the private wireline network and in communication with the processor for providing wireless communications to the subscriber; and a wireline interface coupled between the switch and the processor for enabling the processor to control wireless communications to the subscriber via the base station when the subscriber is located the private wireline network.

9. The system as recited in claim 8 wherein the wireline interface includes line-side features to support the plurality of communications features provided by the private wireline network.

10. The system as recited in claim 9 wherein the wireline interface includes both a voice path and a signaling path for simultaneously transmitting voice and signaling information between the private wireline network and the public wireless network.

11. The system as recited in claim 1 wherein the private wireline network communicates via a wireline communication protocol and the public wireless network communicates via a wireless communication protocol, the system further comprising a processor in the public wireless network and in communication with the wireline interface for translating between the wireline and wireless communication protocols.

12. The system as recited in claim 11 wherein the processor includes a database for storing identification data, the identification data identifying whether or not a user of the public wireless network is a subscriber of the private wireline network.

13. The system as recited in claim 11 wherein the processor is further provided for permitting the subscriber to roam throughout the public wireless network while maintaining communications via the switch.

14. The system as recited in claim 9 wherein the wireline interface includes a plurality of copper wire pairs.

15. The system as recited in claim 9 wherein the wireline interface is an Integrated Services Digital Network (ISDN) interface.

16. The system as recited in claim 9 wherein the wireline interface is a GR-303 interface.

17. The system as recited in claim 8 wherein the private wireline network is a Private Branch Exchange (PBX) and wherein the switch is a PBX switch.

18. The system as recited in claim 8 wherein the private wireline network is a Centrex system and wherein the switch is a Service Switching Point (SSP).

* * * * *